United States Patent
Rhee et al.

(10) Patent No.: US 9,838,838 B2
(45) Date of Patent: Dec. 5, 2017

(54) LOCATION DETERMINATION USING A COMPANION DEVICE

(71) Applicant: Apple Inc., Cupertino, CA (US)

(72) Inventors: Stephen J. Rhee, San Jose, CA (US); Bradley Joel Jensen, San Francisco, CA (US); Robert Mayor, Half Moon Bay, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/869,900

(22) Filed: Sep. 29, 2015

(65) Prior Publication Data

US 2016/0360354 A1  Dec. 8, 2016

Related U.S. Application Data (60) Provisional application No. 62/171,973, filed on Jun. 5, 2015.

(51) Int. Cl.
*H04W 24/00* (2009.01)
*H04W 4/02* (2009.01)
(Continued)

(52) U.S. Cl.
CPC .......... *H04W 4/02* (2013.01); *G01S 5/0236* (2013.01); *H04M 1/72527* (2013.01); *H04W 76/023* (2013.01); *H04W 24/00* (2013.01)

(58) Field of Classification Search
CPC ..... H04W 4/02; H04W 76/023; H04W 24/00; H04M 1/72527; G01S 5/0236
(Continued)

(56) References Cited

U.S. PATENT DOCUMENTS 6,535,815 B2 * 3/2003 Bloebaum ............. G01S 5/0027
340/988
7,277,049 B2 10/2007 Korneluk et al.
(Continued)

FOREIGN PATENT DOCUMENTS

EP         2270534         1/2011
KR     10-2014-0068159     6/2014

OTHER PUBLICATIONS

Invitation to Pay Additional Fees in International Application No. PCT/US2016/034313, dated Aug. 29, 2016, 8 pages.
(Continued)

*Primary Examiner* — Mong-Thuy Tran
(74) *Attorney, Agent, or Firm* — Fish & Richardson P.C.

(57) ABSTRACT

Methods, systems, and computer program products for a mobile device determining its location based on a location of a companion device are described. A mobile device can receive a request for determining a location of the mobile device from an application. The request can include an accuracy specification providing a lower limit on accuracy of the determined location. The mobile device can determine that the mobile device is incapable of achieving that accuracy. The mobile device can then submit a location request to a companion device that has paired with the mobile device. The companion device, upon receiving the location request, can determine a location of the companion device and provide the location of the companion device to the mobile device. The mobile device can then designate the location of the companion device as the location of the mobile device, and provide the location to the application.

20 Claims, 7 Drawing Sheets

(51) Int. Cl.
*H04W 76/02* (2009.01)
*H04M 1/725* (2006.01)
*G01S 5/02* (2010.01)

(58) Field of Classification Search
USPC ............... 455/456.1–456.3, 457; 342/451
See application file for complete search history.

(56) References Cited

U.S. PATENT DOCUMENTS

| | | | | |
|---|---|---|---|---|
| 8,483,705 | B1* | 7/2013 | Cope | H04W 4/043 370/352 |
| 8,787,944 | B2 | 7/2014 | Smith | |
| 8,942,676 | B2* | 1/2015 | Dalton | A61B 5/1112 340/524 |
| 8,948,786 | B2 | 2/2015 | Gillett | |
| 9,232,354 | B2* | 1/2016 | Smith | H04W 64/00 |
| 9,301,082 | B2 | 3/2016 | Meyers et al. | |
| 2002/0019698 | A1* | 2/2002 | Vilppula | G01S 5/0257 702/150 |
| 2003/0220116 | A1 | 11/2003 | Sagefalk et al. | |
| 2004/0192335 | A1* | 9/2004 | Wong | H04W 64/00 455/456.1 |
| 2006/0121913 | A1* | 6/2006 | Lin | H04W 4/02 455/456.1 |
| 2009/0281724 | A1* | 11/2009 | Blumenberg | G01C 21/3614 701/532 |
| 2010/0324813 | A1* | 12/2010 | Sundararajan | G01C 21/20 701/532 |
| 2011/0039623 | A1* | 2/2011 | Levenson | A63F 13/60 463/42 |
| 2011/0084803 | A1* | 4/2011 | Niemela | G06F 21/6245 340/8.1 |
| 2011/0165892 | A1* | 7/2011 | Ristich | H04W 64/00 455/456.2 |
| 2012/0286997 | A1* | 11/2012 | Lin | G01S 5/0252 342/451 |
| 2013/0030931 | A1* | 1/2013 | Moshfeghi | G01S 19/48 705/16 |
| 2014/0045463 | A1 | 2/2014 | Hsieh et al. | |
| 2014/0094195 | A1 | 4/2014 | Luo et al. | |
| 2014/0256346 | A1 | 9/2014 | Venkatraman et al. | |
| 2014/0342755 | A1* | 11/2014 | Youssef | G01S 1/685 455/456.2 |
| 2014/0357198 | A1* | 12/2014 | Ye | H04W 4/02 455/73 |
| 2014/0358434 | A1 | 12/2014 | Zhang et al. | |
| 2014/0359078 | A1* | 12/2014 | Liu | H04L 65/80 709/219 |
| 2015/0172858 | A1* | 6/2015 | Choi | H04W 4/02 455/456.1 |
| 2015/0358778 | A1* | 12/2015 | Heo | H04W 4/023 455/456.6 |
| 2015/0381606 | A1* | 12/2015 | Srivastav | G06F 17/30864 726/4 |
| 2016/0269852 | A1 | 9/2016 | Meyers et al. | |

OTHER PUBLICATIONS

International Search Report and Written Opinion of the International Application No. PCT/US2016/034313, dated Nov. 29, 2016, 22 pages.

* cited by examiner

LOCATION DETERMINATION USING A COMPANION DEVICE

CROSS-REFERENCE TO RELATED APPLICATION

This application claims priority to U.S. Provisional Patent Application No. 62/171,973, entitled "Location Determination Using A Companion Device," filed Jun. 5, 2015, the entire contents of which are incorporated herein by reference.

TECHNICAL FIELD

This disclosure relates generally to location determination.

BACKGROUND

Some wireless devices can be wirelessly connected or "paired" with one another. When the two devices are paired with one another, the two devices can communicate with one another, including submitting information to and receiving information from one another wirelessly, without requiring human intervention. Pairing can involve a wireless handshaking process, where for example, a first device broadcasts a signal, a second device detects the signal and establishes a wireless connection with the first device. The first device and second device are then paired. The first device and second device can be companion devices in the pair. A simple example of pairing is adding an audio output device to an electronic device. For example, a mobile device (e.g., a smart phone) can be paired to a wireless headset or a car audio system. When paired, the headset becomes an audio output device for the smart phone.

SUMMARY

Techniques for determining a location using a companion device are described. A mobile device can receive a request for determining a location of the mobile device from an application. The request can include an accuracy specification providing a lower limit on accuracy of the determined location. The mobile device can determine that the mobile device is incapable of achieving that accuracy. The mobile device can then submit a location request to a companion device that has paired with the mobile device. The companion device, upon receiving the location request, can determine a location of the companion device and provide the location of the companion device to the first mobile device. The mobile device can then designate the location of the companion device as the location of the mobile device, and provide the location to the application.

The features described in this specification can be implemented to achieve various advantages. For example, compared to conventional location determination, the techniques described in this specification are more flexible. Conventionally, if a device receives a request for location but is incapable of providing the location as requested, the device may respond by indicating a failure. Using the technology described herein, the device can attempt to get the location by requesting help from a paired companion device, which may be more capable of determining its own location. A request for help can be made in the background, without user intervention. Accordingly, the device can produce fewer failures, and provide a better user experience.

The details of one or more implementations of the techniques are set forth in the accompanying drawings and the description below. Other features, aspects and advantages of the indoor location survey techniques will become apparent from the description, the drawings and the claims.

BRIEF DESCRIPTION OF THE DRAWINGS

Like reference symbols in the various drawings indicate like elements.

DETAILED DESCRIPTION

Example Location Estimation

Figure 1:
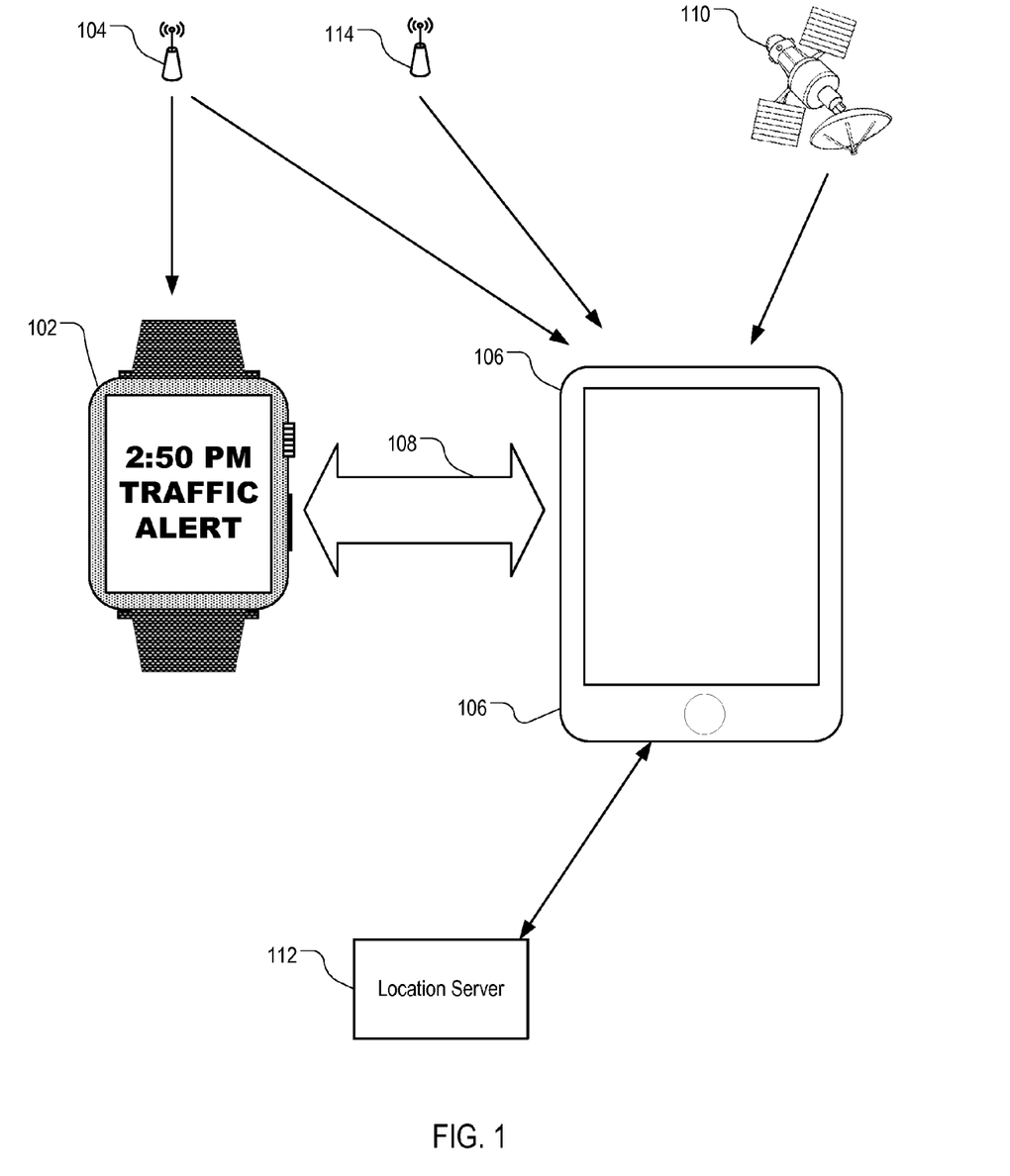
FIG. 1 is a diagram illustrating example techniques of location determination using a companion device.

FIG. 1 is a diagram illustrating example techniques of location determination using a companion device. Mobile device 102 can be any device that can pair with a companion device. For example, mobile device 102 can be a wearable electronic device, e.g., a smart watch. Mobile device 102 can execute one or more application programs. An application program can be configured to provide a location-based service, e.g., displaying a traffic alert for a current location.

To perform the location-based service, the application program can request a location of mobile device 102. For example, a traffic warning application program may request a current location of mobile device 102 for use as a starting point for a route to a destination. The application program can send the request to a location subsystem of mobile device 102. The request can specify a location accuracy requirement of the application program. Different application programs may request different location accuracy. For example, a traffic warning application may request higher location accuracy (e.g., on a scale of meters) than a time zone display application may request (e.g., on a scale of kilometers).

The location subsystem of mobile device 102 can determine the location of mobile device 102 using various technologies. For example, the location subsystem can determine the location using wireless signals from signal source 104. Signal source 104 can be a wireless access point broadcasting an identifier, e.g., a media access control (MAC) address. Upon detecting the signal and decoding the identifier, mobile device 102 can determine whether signal source 104 has a known location and if yes, use the known location to determine the location of mobile device 102.

Mobile device 102 can determine that the location subsystem is incapable of determining the location of mobile device 102 at a degree of accuracy that satisfies the accuracy specification in the location request. For example, the application program may request a 50-meter accuracy but the location subsystem can only provide at most a 100-meter accuracy. Instead of providing a response to the location request indicating a failure in location determination, mobile device 102 can request help from companion device 106.

Companion device 106 can be an electronic device (e.g., a mobile phone, a tablet computing device or another wearable device) that is located in the vicinity of mobile device 102 and has paired with mobile device 102. Companion device 106 is located in the vicinity of mobile device 102 if companion device 106 is located within range of mobile device 102 for communicating using a short-range communication technology. The short-range communication technology (e.g., Bluetooth™) can vary between implementations. The short range (e.g., 10 meters or less) is a range that is shorter than the accuracy requirement. Companion device 106 is paired with mobile device 102 after communication channel 108 has been established between mobile device 102 and companion device 106. Either mobile device 102 or companion device 106 may initiate the pairing by establishing communication channel 108. In various implementations, the pairing can occur prior to the location request; alternatively, the pairing can be triggered by the location request.

Mobile device 102 can submit the location request, including the accuracy specification, to companion device 106. Companion device 106 can have a location subsystem that is more capable than the location subsystem of mobile device 102. For example, companion device 106 may include a global navigation satellite system (GNSS) receiver that mobile device 102 does not have. The GNSS receiver can determine a location of companion device 106 using signals from satellites 110 of the GNSS. A location determined based on GNSS may be more accurate than the location determined by the location subsystem of mobile device 102.

In addition, companion device 106 may have location data that is more complete than location data stored on mobile device 102. Companion device 106 may request location data from location server 112. Location server 112 can include one or more computers storing locations of one or more signal sources, e.g., signal sources 104 and 114. Location server 112 can store radio frequency (RF) signal fingerprints. The RF fingerprints can include expected measurements (e.g., RSSIs) of signals inside one or more venues. Mobile device 102 and companion device 106 may use the RF fingerprints to determine a location inside of a venue. Companion device 106, after receiving the location data from location server 112, can synchronize with mobile device 102 by providing the received location data to mobile device 102 through communication channel 108. Due to various reasons (e.g., interference in communication, dormant state of mobile device 102, etc.), the synchronization may fail. As a result, mobile device 102 may not possess the location data.

When mobile device 102 does not have the location data, mobile device 102 may not be able to determine a location. Mobile device 102 can submit the location request to companion device 106 through communication channel 108. Upon receiving the request, companion device 106 can determine a location of companion device 106 using measured signals from signal sources 104 and 114, the location data and a statistical filter for estimating the location. Companion device 106 can then provide the location to mobile device 102 through communication channel 108.

Upon receiving the location from companion device 106, mobile device 102 can adopt the location as a location of mobile device 102 due to the proximity of mobile device 102 and companion device 106. The received location can include or be associated with an uncertainty value, which can correspond to the accuracy of the received location as determined by companion device 106. Upon determining that the accuracy satisfies the accuracy specification provided by the application program, mobile device 102 can provide the received location to the application program. The application program can then provide the location-based service (e.g., the traffic warning) using the location as a parameter.

Various conditions (e.g., lack of accuracy capability or lack of location data) can trigger submission of a location request by mobile device 102 to companion device 106. In some implementations, to simplify the operations of determining whether mobile device 102 can provide the requested location accuracy, mobile device 102 can determine whether the requested location accuracy satisfies an accuracy threshold (e.g., 100 meters). If the accuracy specification requires an accuracy that is less than the accuracy threshold (e.g., <100 meters), then mobile device 102 requests the location from companion device 106. Otherwise, mobile device 102 can attempt to determine a location using the location subsystem of mobile device 102. Additional details and examples on trigger conditions for submitting the location request to companion device 106 are described below in reference to FIG. 2.

Example Conditions for Requesting Companion Device

Figure 2:
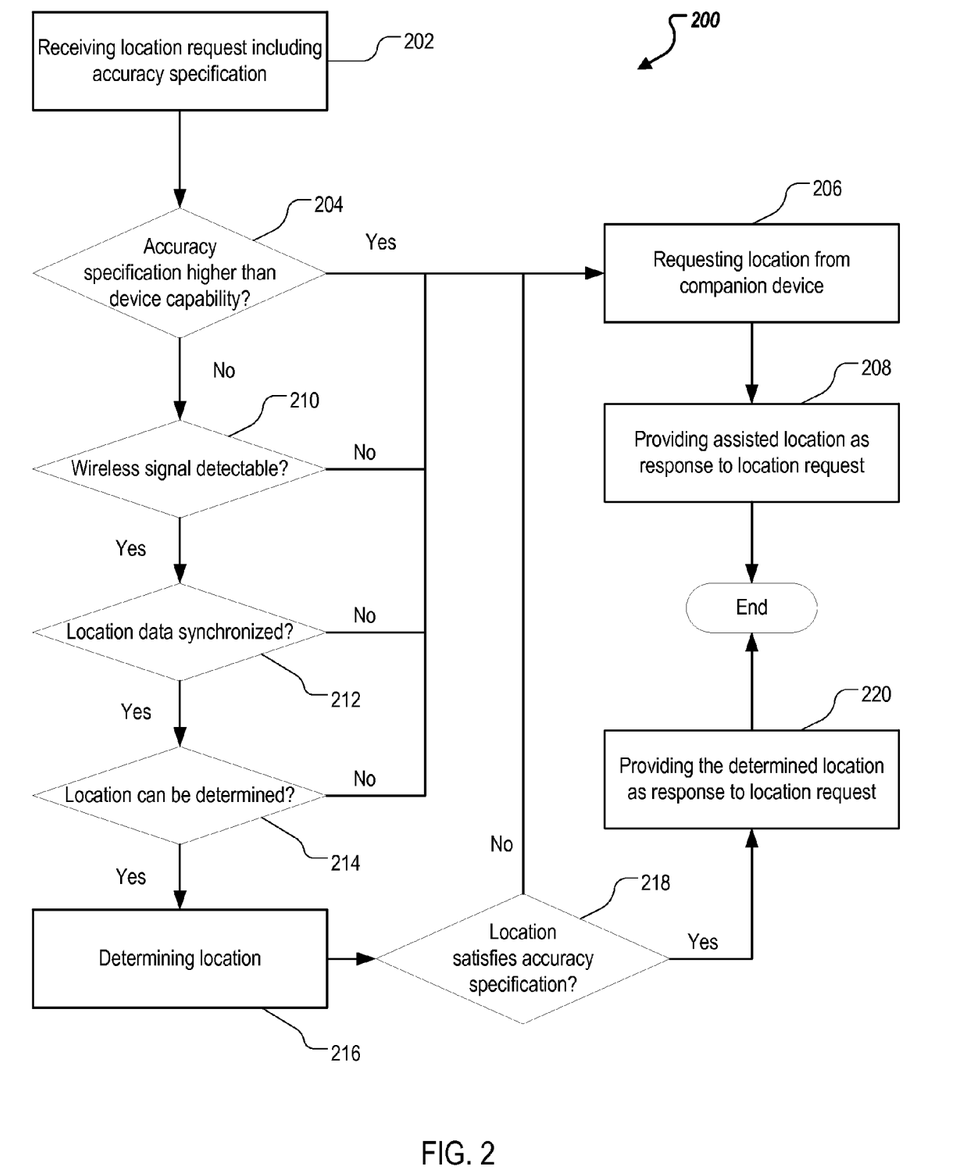
FIG. 2 is a flowchart of an example process of location determination using a companion device.

FIG. 2 is a flowchart of example process 200 of location determination using a companion device. Process 200 can be performed by mobile device 102 and companion device 106. In some implementations, process 200 can be implemented using the architecture described in FIGS. 3 and 6.

Mobile device 102 can receive (202) a location request from an application program. The application program can be a program executing on mobile device 102, or a program executing remotely from mobile device 102. The location request can include or otherwise be associated with an accuracy specification (e.g., in meters). The application program can submit the location request through a function call defined by an application programming interface (API).

Mobile device 102 can determine (204) whether mobile device 102 can provide the requested accuracy. For example, the requested accuracy may be beyond the capability of the location subsystem to determine. In some implementations, the requested accuracy is compared to a threshold accuracy to determine if mobile device 102 can provide the requested accuracy.

Upon determining that the accuracy specification is higher than capability of a location subsystem of mobile device 102, mobile device 102 can request (206) location from companion device 106 that is paired to mobile device 102. Mobile device 102 can receive a response from companion device 106. The response can include location assistance information. The location assistance information can include an estimated location of companion device 106 as determined by companion device 106. Alternatively or additionally, the location assistance information can include data that can assist mobile device 102 to determine a location. The data can include, for example, map coordinates, RF fingerprint data, or other data that can be used by a location subsystem of mobile device 102 to determine a location.

Mobile device 102 can determine a location using the location assistance data. The location determined using the location assistance data can be referred to as an assisted location of mobile device 102. The assisted location can include the location of companion device 106, if provided. The assisted location can include a location estimate using the map coordinates, RF fingerprint data or other data as parameters, where the location estimate has an uncertainty that satisfies the accuracy specification. Mobile device 102 can provide (208) the assisted location to the application as a response to the location request.

Upon determining that the accuracy specification is within the capability of a location subsystem of mobile device 102, mobile device 102 can determine (210) if the location subsystem received signals for determining the location of mobile device 102. For example, if the location subsystem uses wireless signals from access points to determine a location, mobile device 102 can determine whether access points are detected, and if detected, whether the signals are sufficiently strong for location determination. If mobile device 102 cannot detect signal sources, or signals are too weak, mobile device 102 can request (206) location from companion device 106.

Upon determining that signals are available, mobile device 102 can determine (212) whether location data has been synchronized. Determining whether location data has been synchronized can include determining whether mobile device 102 received the location data from companion device 106 that contains information of the detected signal sources. For example, mobile device 102 may have detected wireless access points having MAC addresses AP1 and AP2. Mobile device 102 can determine whether mobile device 102 has location data specifying locations or RF fingerprints of AP1 and AP1. If not, mobile device 102 can determine that location data is not synchronized and request (206) location from companion device 106.

Upon determining that location data is synchronized, mobile device 102 can determine (214) whether mobile device 102 can determine a location using the detected signals and the synchronized location data. Mobile device 102 can determine whether mobile device 102 can determine a location by examining the detected signals and determine whether the signals are consistent with one another. For example, mobile device 102 can detect two wireless access points that are not located in the vicinity (e.g., in a same city) of one another according to the location data. Absent additional data, mobile device 102 may not be able to determine in which city mobile device 102 is located. If mobile device 102 is unable to determine a location, mobile device 102 can request (206) location from companion device 106. If mobile device 102 is able to determine a location, mobile device 102 can determine (216) the location using the location subsystem.

Mobile device 102 can determine (218) whether the location determined by the location subsystem satisfies the accuracy specification. Determining whether the location determined by the location subsystem satisfies the accuracy specification can include determining whether an uncertainty of the location, as provided by the location subsystem, is greater than the accuracy specification. Upon determining that the location determined by the location subsystem satisfies the accuracy specification, mobile device 102 can provide (220) the determined location as a response to the location request. Upon determining that the location determined by the location subsystem does not satisfy the accuracy specification, mobile device 102 can request (206) location from companion device 106.

Example Device

Figure 3:
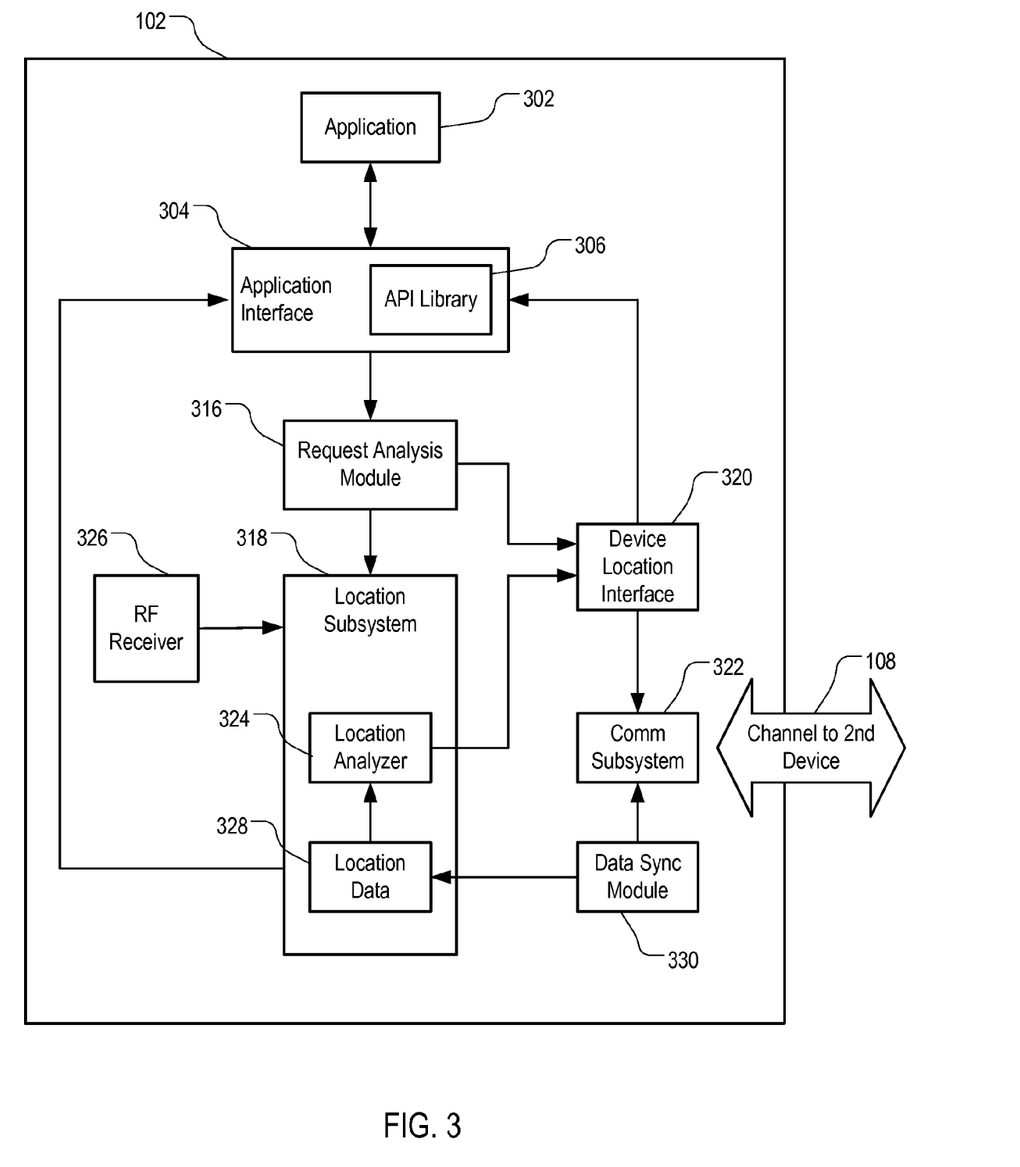
FIG. 3 is a block diagram illustrating components of an example device implementing location determination techniques.

FIG. 3 is a block diagram illustrating components of example mobile device 102 implementing location determination techniques. Mobile device 102 can include application program 302. Application program 302 can be a system or user program providing a location-based service. Application program 302 can request location of mobile device 102 by sending a location request by making an application programming interface (API) call.

Mobile device 102 can include application interface 304. Application interface 304 is a component of mobile device 102 configured to receive the location request and respond to the location request. Application interface 304 can include API library 306. API library 306 can include a program library that can receive specified calls from application program 302.

The location request can be method call defined in API library 306 as requestLocation. The call can allow application program 302 to request a location update from a location service of mobile device 102. The location service can attempt to determine location with the requested accuracy according to a specified property desiredAccuracy. The location service can deliver the location update to application program 302 via a standard delegate callback of a location manager, e.g., by calling locationManager:didUpdateLocations. If the available location has lower accuracy, the location service can deliver the location via a standard delegate callback after a timeout. If the location service cannot determine the location, the location service can call a locationManager:didFailWithError method and deliver a delegate callback with error location unknown.

API library 306 can limit outstanding location requests to a pre-specified number (e.g., one) and prevent the method requestLocation from being used concurrently with a startUpdatingLocation or allowDeferredLocationUpdates method. Calling either of those methods can immediately cancel the location request. The method stop UpdatingLocation can be used to cancel the request explicitly.

API library 306 can define a property desiredAccuracy as follows.

@property(assign, nonatomic) CLLocationAccuracy desiredAccuracy;

The desiredAccuracy property can be the accuracy specification of the location. The location service can try to deliver the desired accuracy. However, the location service may not guarantee the location accuracy. To optimize power performance, a large accuracy value can be specified when only a coarse location is needed. API library 306 can specify a constant kCLLocationAccuracyBest to provide the highest possible accuracy. API library 306 can specify a constant kCLLocationAccuracyBestForNavigation for navigation. The default values of these constants can vary by platform.

Request analysis module 316 and location subsystem 318 can provide the location service as described above. Request analysis module 316 is a component of mobile device 102 configured to determine whether location subsystem 318 can satisfy the desiredAccuracy property as specified by application program 302. To make the determination, request analysis module 316 can compare the value of the desiredAccuracy property with a pre-specified threshold (e.g., X meters). Upon determining that the value of the desiredAccuracy property is greater than the pre-specified threshold, request analysis module 316 can pass the location request to location subsystem 318. Otherwise, request analysis module 316 can pass the location request to device location interface 320.

Device location interface 320 is a component of mobile device 102 configured to submit a location request to a companion device, receive a location from the companion device, and provide the received location to application program 302 through application interface 304. Device location interface 320 can submit the location request through communication subsystem 322.

Communication subsystem 322 is a component of mobile device 102 configured to pair with a second device, e.g. companion device 106. Communication subsystem 322 can open communication channel 108, including performing various authentication and authorization functions. Communication subsystem 322 can submit the location request to, and receive the location from, companion device 106.

Location subsystem 318 is a component of mobile device 102 configured to determine a location of mobile device 102. Location subsystem 318 can determine the location using various technologies, e.g., by using Wi-Fi™ location determination. Location subsystem 318 can include location analyzer 324. Location analyzer 324 can receive readings from radio frequency (RF) receiver 326. Location analyzer 324 can determine whether the readings are sufficient for determining a location of mobile device 102. Location analyzer 324 can determine that location subsystem 318 cannot achieve the accuracy specification. For example, location analyzer 324 can determine that due to lack of access points, weak RSSI or lack of location data, it is impossible to determine a location using measurements of RF receiver 326. Location analyzer 324 can then submit the location request to device location interface 320 for processing.

Alternatively, location analyzer 324 can determine a location of mobile device 102 using signal measurements received from RF receiver 326 and location data 328. Mobile device 102 can receive location data 328 from companion device 106. Mobile device 102 can include data synchronization module 330. Data synchronization module 330 is a component of mobile device 102 configured to request location data from companion device 106, receive the location data from companion device 106, and store the location data for location subsystem 318. Data synchronization module 330 can communicate with companion device 106 through communication subsystem 322.

Either location subsystem 318 or device location interface 320 can submit a location to application interface 304. Application interface 304 can then provide the location and associated accuracy to application program 302 as a return value of the API call. Application program 302 can then provide a location-based service using the returned location. The location-based service can include, for example, displaying a map or a location-based alert.

Figure 4:
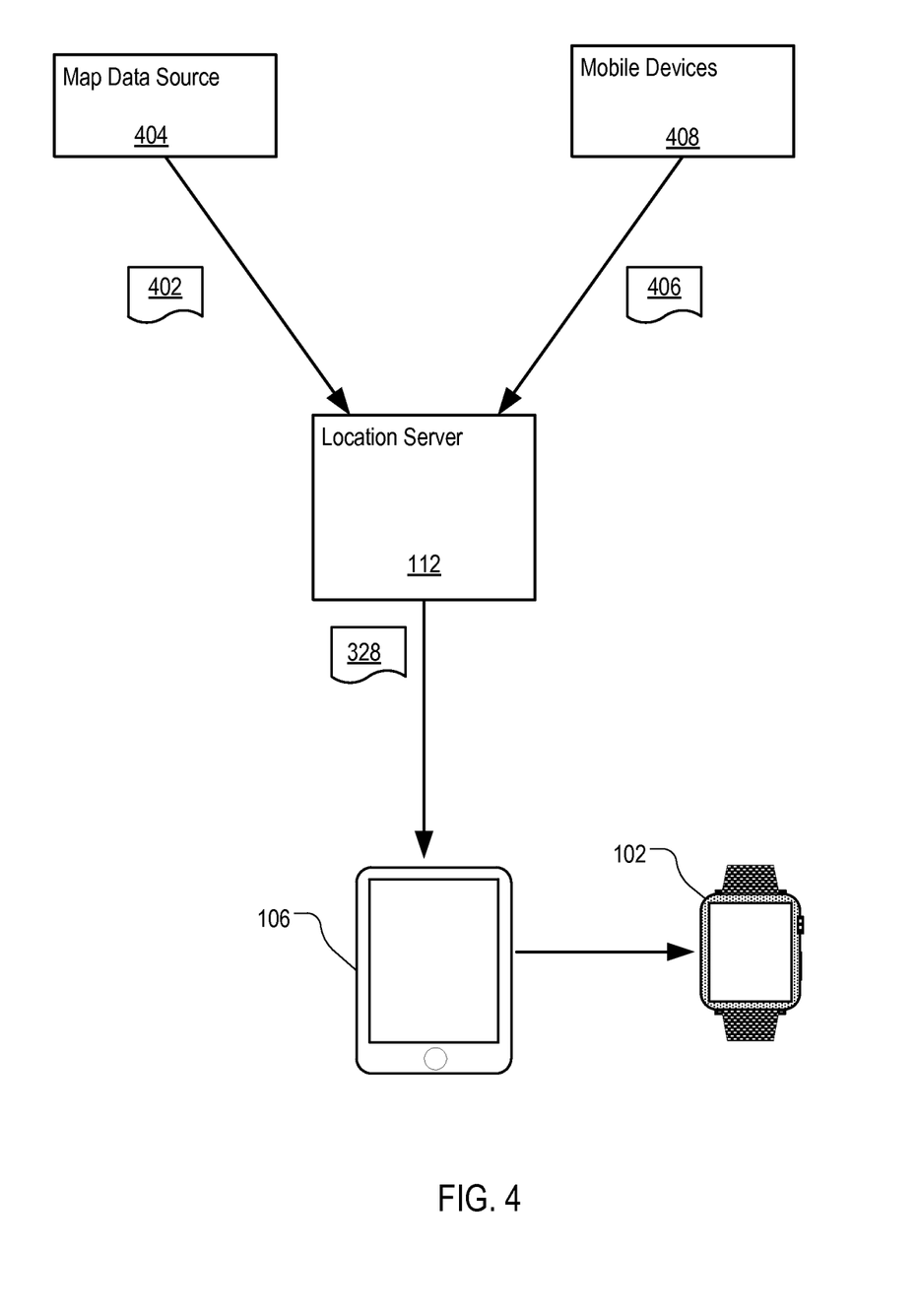
FIG. 4 is a block diagram illustrating example data flow.

FIG. 4 is a block diagram illustrating example data flow. Location server 112 can include one or more computers configured to provide location data 328 to companion device 106. Location data 328 can include locations of various signal sources and RF fingerprint data for one or more venues. Location server 112 can generate location data 328 using map data 402 from map data source 404. Map data 402 can include a map of geographic locations (e.g., cities, postal areas or neighborhoods) and venues (e.g., buildings, campuses or parks). Map data 402 can include representations of structural features of the venues, including for example, locations and sizes of walls, columns and other inaccessible features.

Location server 112 can receive crowd-sourced data 406 from mobile devices 408. Crowd-sourced data 406 can include identifiers of signal sources associated with locations. Location-aware mobile devices 408 can submit those identifiers detected by location-aware mobile devices 408. Crowd-sourced data 406 can include data from surveys performed by mobile devices 408 at various venues. The survey data can include measurements (e.g., RSSI) of signal sources at various locations of a venue.

Location server 112 can determine location data 328 based on map data 402 and crowd-sourced data 406. Location server 112 can then provide location data 328 to companion device 106. Companion device 106 can provide location data 328 to mobile device 102 during data synchronization. The data synchronization can occur through communication channel 108. Either companion device 106 or mobile device 102 can initiate the synchronization.

Example Procedures

Figure 5:
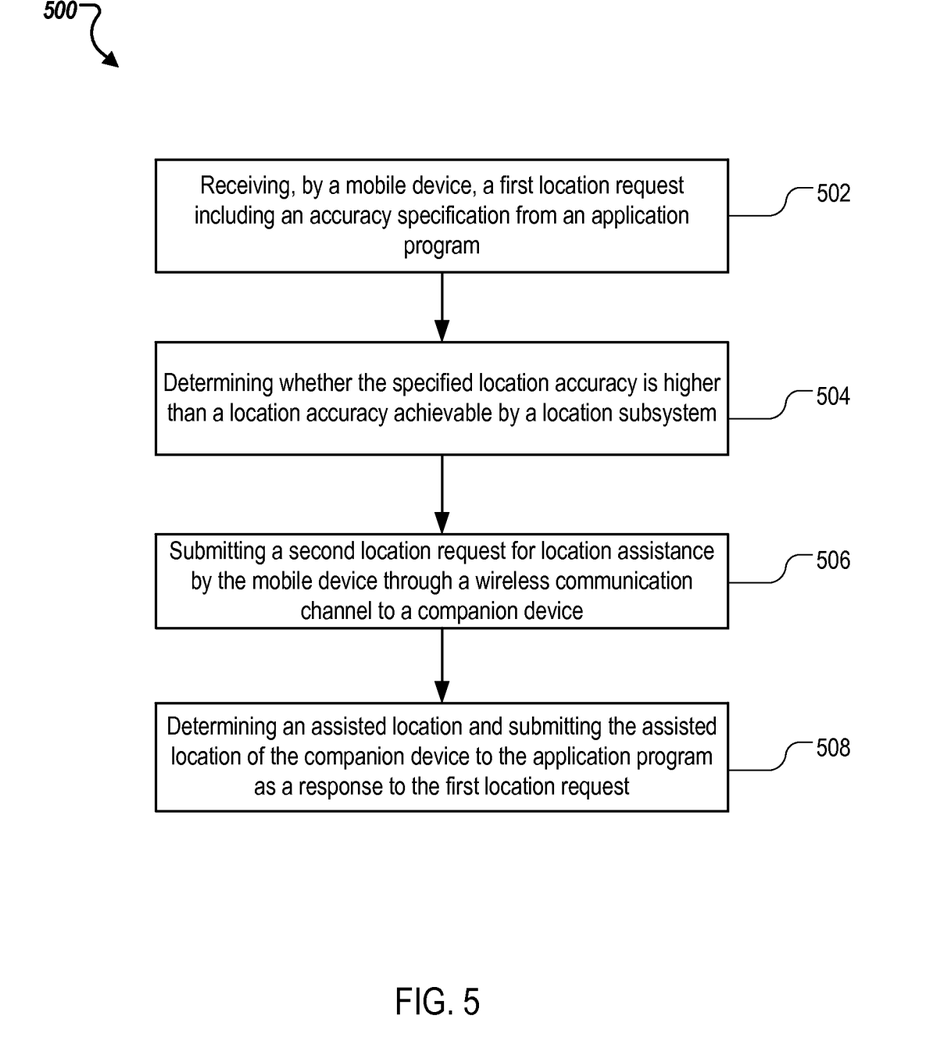
FIG. 5 is a flowchart of an example process of location determination using a companion device.

FIG. 5 is a flowchart of example process 500 of location determination using a companion device. Process 500 can be performed by mobile device 102 and companion device 106 using the architecture shown in FIGS. 3 and 6.

Mobile device 102 can receive (502) a first location request from an application program executing on mobile device 102. The first location request can request a location of the mobile device 102. The first location request can include an accuracy specification specifying a location accuracy for the location. Mobile device 102 can be a wearable computing device. The application program can submit the first location request as a call to a function defined in an API used by the application program. The accuracy specification can be designated as a property by the API.

Mobile device 102 can determine (504) whether the specified location accuracy is higher than a location accuracy achievable by a location determination subsystem (e.g., location subsystem 318) of mobile device 102. Determining that the specified location accuracy is higher than the location accuracy achievable by the location determination subsystem can include determining that the specified location accuracy is smaller than a pre-specified threshold value.

In response to determining that the specified location accuracy is higher than a location accuracy achievable by the location determination subsystem, mobile device 102 can submit (506) a second location request through a wireless communication channel (e.g., communication channel 108) to companion device 106 that has paired with mobile device 102. Companion device 106 can be a smartphone. The second location request can request location assistance data from companion device 106. The second location request can specify the location accuracy according to the accuracy specification in the first location request. The wireless communication channel can be established using a protocol in which a communication range between the devices is less than the accuracy specification. The location assistance information can include a location of companion device 106. The location assistance information can include data that can improve accuracy of a location estimate of the mobile device. The data can include map coordinates, GNSS location, RF fingerprint data or other data.

In response to determining that the specified location accuracy is not higher than the location accuracy achievable by the location determination subsystem, mobile device 102 can determine that the location determination subsystem of mobile device 102 is incapable of determining the location of mobile device 102. In response to determining that the location determination subsystem of mobile device 102 is incapable of determining the location of mobile device 102, mobile device 102 can submit the second location to companion device 106. The location determination subsystem can be configured to determine the location of mobile device 102 based on RF fingerprint data received from companion device 106 by a prior synchronization.

In some implementations, determining that the location determination subsystem of mobile device 102 is incapable of determining the location of mobile device 102 can include at least one of decisions of operation 210, 212 or 214. For example, mobile device 102 can determine that mobile device 102 has not received the RF fingerprint data. Mobile device 102 can make the determination upon determining that no wireless signal sources corresponding to received RF fingerprint data have been detected.

Upon receiving the location assistance information of companion device 106, mobile device 102 can determine (508) an assisted location and submit the assisted location to the application program as a response to the first location request. The assisted location can include a location of companion device 106. The assisted location can include a location determined by a location subsystem of mobile device 102 using the location assistance data as parameters. Accuracy of the assisted location of companion device 106 can satisfy the accuracy specification. The application program can then provide a location-based service using the assisted location as a substitute for mobile device 102.

Example Mobile Device Architecture

Figure 6:
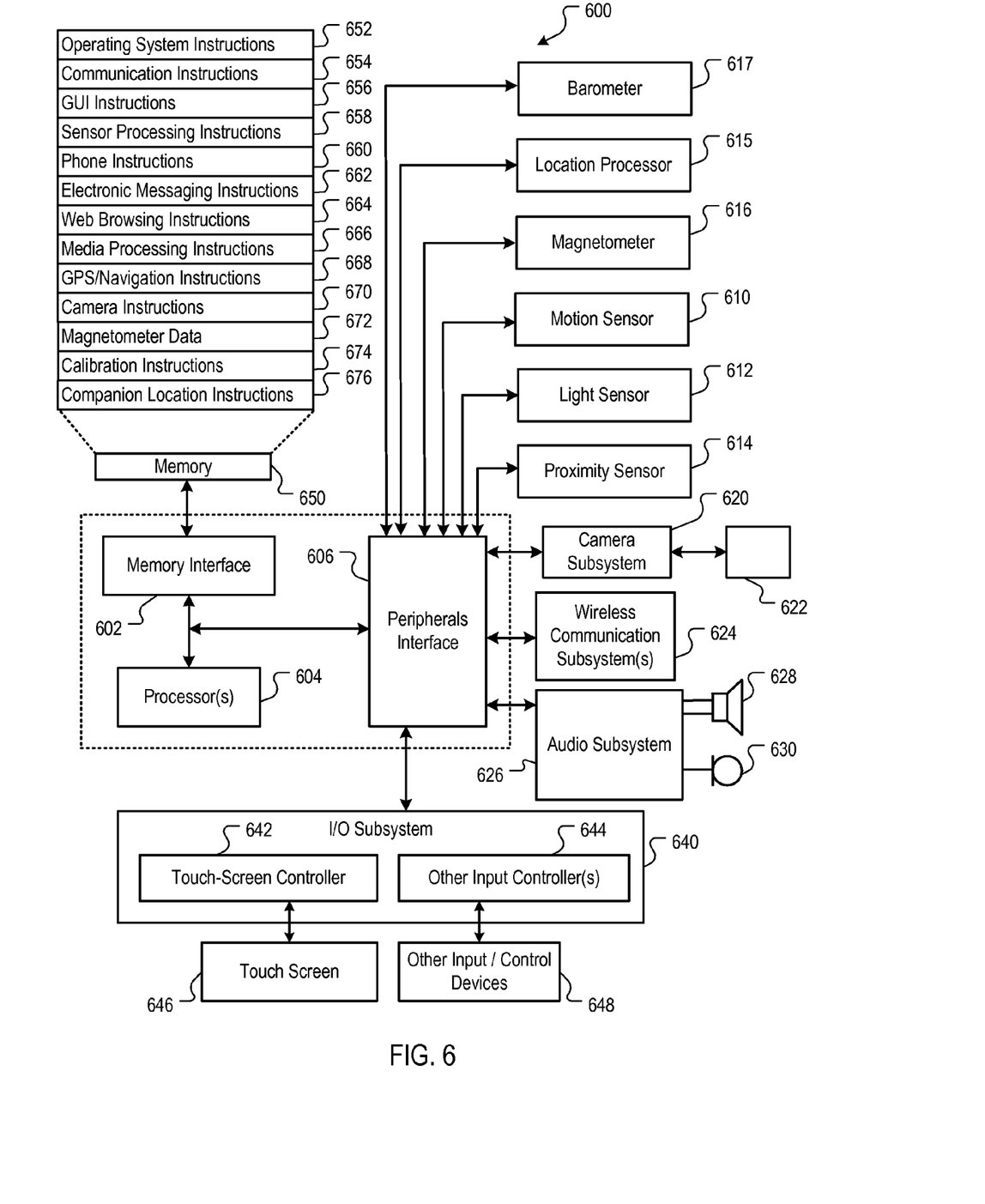
FIG. 6 is a block diagram illustrating an example device architecture of a mobile device implementing the features and operations described in reference to FIGS. 1-5.

FIG. 6 is a block diagram of an example architecture 600 for a mobile device. A mobile device (e.g., mobile device 102 or companion device 106) can include memory interface 602, one or more data processors, image processors and/or processors 604, and peripherals interface 606. Memory interface 602, one or more processors 604 and/or peripherals interface 606 can be separate components or can be integrated in one or more integrated circuits. Processors 604 can include application processors, baseband processors, and wireless processors. The various components in the mobile device, for example, can be coupled by one or more communication buses or signal lines.

Sensors, devices and subsystems can be coupled to peripherals interface 606 to facilitate multiple functionalities. For example, motion sensor 610, light sensor 612 and proximity sensor 614 can be coupled to peripherals interface 606 to facilitate orientation, lighting and proximity functions of the mobile device. Location processor 615 (e.g., GPS receiver) can be connected to peripherals interface 606 to provide geopositioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass. Motion sensor 610 can include one or more accelerometers configured to determine change of speed and direction of movement of the mobile device. Barometer 617 can include one or more devices connected to peripherals interface 606 and configured to measure pressure of atmosphere around the mobile device.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which a mobile device is intended to operate. For example, a mobile device can include communication subsystems 624 designed to operate over a GSM network, a GPRS network, an EDGE network, a Wi-Fi™ or WiMax™ network and a Bluetooth™ network. In particular, the wireless communication subsystems 624 can include hosting protocols such that the mobile device can be configured as a base station for other wireless devices.

Audio subsystem 626 can be coupled to a speaker 628 and a microphone 630 to facilitate voice-enabled functions, such as voice recognition, voice replication, digital recording, and telephony functions. Audio subsystem 626 can be configured to receive voice commands from the user.

I/O subsystem 640 can include touch surface controller 642 and/or other input controller(s) 644. Touch surface controller 642 can be coupled to a touch surface 646 or pad. Touch surface 646 and touch surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 646. Touch surface 646 can include, for example, a touch screen.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch surface 646; and a pressing of the button for a second duration that is longer than the first duration may turn power to the mobile device on or off. The user may be able to customize a functionality of one or more of the buttons. The touch surface 646 can, for example, also be used to implement virtual or soft buttons and/or a keyboard.

In some implementations, the mobile device 102 can present recorded audio and/or video files, such as MP3, AAC, and MPEG files. In some implementations, the mobile device can include the functionality of an MP3 player. Other input/output and control devices can also be used.

Memory interface 602 can be coupled to memory 650. Memory 650 can include high-speed random access memory and/or non-volatile memory, such as one or more magnetic disk storage devices, one or more optical storage devices, and/or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; magnetometer data 672 and calibration instructions 674 to facilitate magnetometer calibration. The memory 650 may also store other software instructions (not shown), such as security instructions, web video instructions to facilitate web video-related processes and functions, and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 650. Memory 650 can store companion location instructions 676 that, when executed, can cause processor 604 to perform operations of example processes 200 and 500 as described above in reference to FIGS. 2 and 5.

Each of the above identified instructions and applications can correspond to a set of instructions for performing one or more functions described above. These instructions need not be implemented as separate software programs, procedures or modules. Memory 650 can include additional instructions or fewer instructions. Furthermore, various functions of the mobile device may be implemented in hardware and/or in software, including in one or more signal processing and/or application specific integrated circuits.

Example Operating Environment

Figure 7:
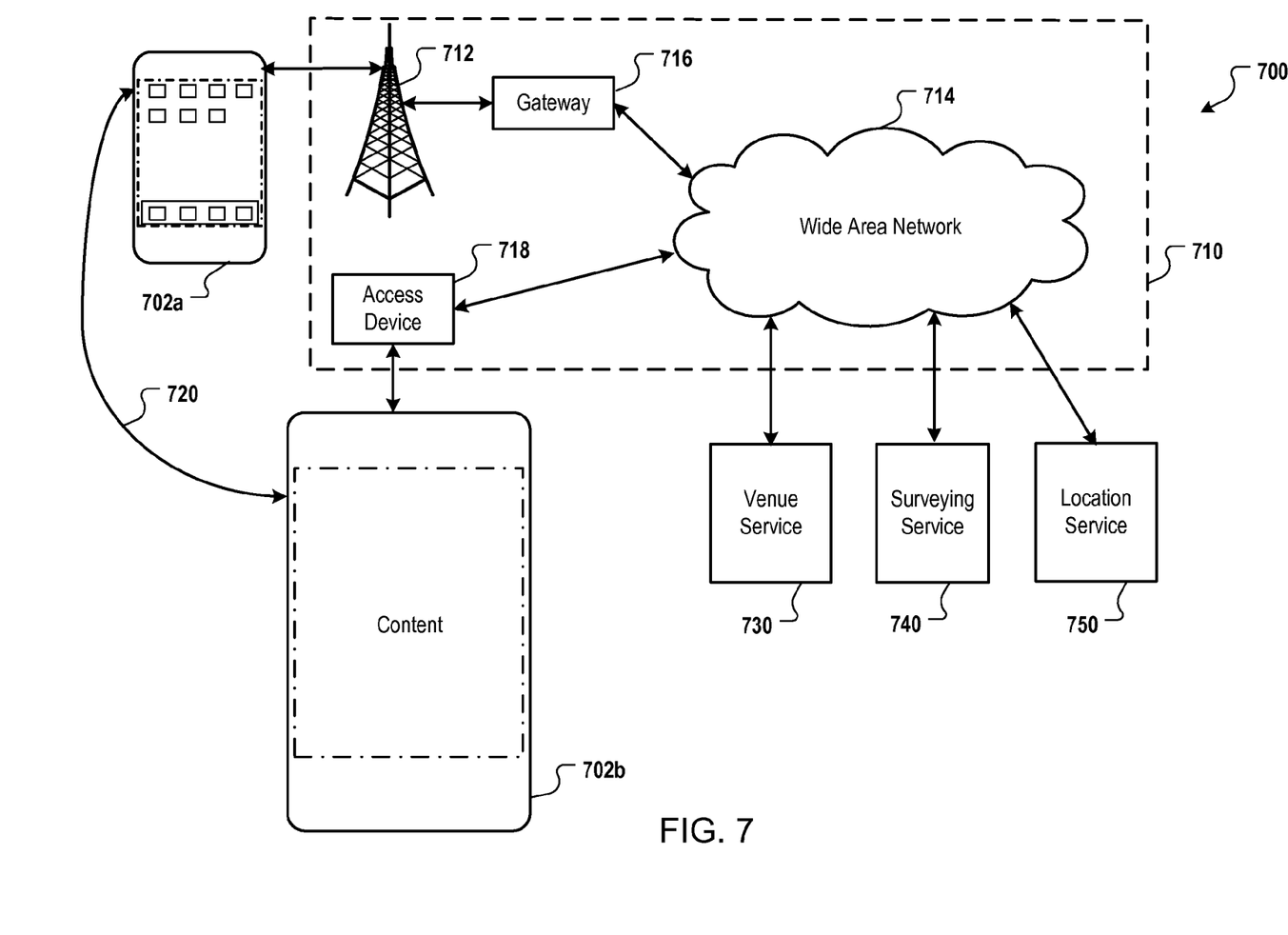
FIG. 7 is a block diagram of an example network operating environment for the mobile devices of FIGS. 1-6.

FIG. 7 is a block diagram of an example network operating environment 700 for the mobile devices of FIGS. 1-6. Mobile devices 702a and 702b can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access device 718, such as an 802.11g wireless access point, can provide communication access to the wide area network 714. Each of mobile devices 702a and 702b can be mobile device 102 or companion device 106.

In some implementations, both voice and data communications can be established over wireless network 712 and the access device 718. For example, mobile device 702a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 712, gateway 716, and wide area network 714 (e.g., using Transmission Control Protocol/Internet Protocol (TCP/IP) or User Datagram Protocol (UDP)). Likewise, in some implementations, the mobile device 702b can place and receive phone calls, send and receive e-mail messages, and retrieve electronic documents over the access device 718 and the wide area network 714. In some implementations, mobile device 702a or 702b can be physically connected to the access device 718 using one or more cables and the access device 718 can be a personal computer. In this configuration, mobile device 702a or 702b can be referred to as a "tethered" device.

Mobile devices 702a and 702b can also establish communications by other means. For example, wireless mobile device 702a can communicate with other wireless devices, e.g., other mobile devices, cell phones, etc., over the wireless network 712. Likewise, mobile devices 702a and 702b can establish peer-to-peer communications 720, e.g., a personal area network, by use of one or more communication subsystems, such as the Bluetooth™ communication devices. Other communication protocols and topologies can also be implemented.

The mobile device 702a or 702b can, for example, communicate with one or more services 730, 740, and 750 over the one or more wired and/or wireless networks. For example, one or more venue services 730 can provide venue information to mobile devices 702a and 702b from a venue data source. The venue information can include venue identifiers associated with venue maps. Survey service 740 can receive survey data from one or more survey devices and provide the survey data to location server 112. Location server 112 can provide location service 750. Location service 750 can include providing crowd-sourced data including locations of signal sources and RF fingerprints for venues to mobile devices 702a and 702b.

Mobile device 702a or 702b can also access other data and content over the one or more wired and/or wireless networks. For example, content publishers, such as news sites, Really Simple Syndication (RSS) feeds, web sites, blogs, social networking sites, developer networks, etc., can be accessed by mobile device 702a or 702b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
   receiving, by a mobile device, a first location request requesting a location of the mobile device, the first location request specifying a requested accuracy level;
   determining, by a location determination subsystem of the mobile device, a first location estimate of the mobile device, the first location estimate being associated with an uncertainty value that is determined by the location determination subsystem;
   determining whether the uncertainty value satisfies the requested accuracy level;
   in response to determining that the uncertainty value does not satisfy the requested accuracy level, determining, by the mobile device, that the location determination subsystem of the mobile device is incapable of determining the location of the mobile device at the requested accuracy level under current conditions;
   in response to determining that the location determination subsystem of the mobile device is incapable of determining the location of the mobile device-at the requested accuracy level, submitting a second location request by the mobile device to a companion device that has paired with the mobile device, wherein the location determination subsystem is configured to determine the location of the mobile device based on location assistance information received from the companion device;
   comparing the specified requested accuracy level to data representing a communication range of a communication protocol between the mobile device and the companion device;
   determining that the communication range between the mobile device and the companion device meets the specified requested accuracy level; and in response to receiving a response to the second location request from the companion device, the response including the location assistance information, submitting a second location estimate corresponding to the location assistance information as a response to the first location request.

2. The method of claim 1, wherein:
the location determination subsystem is configured to determine the location of the mobile device based on radio frequency (RF) fingerprint data;
the location assistance information received from the companion device includes the RF fingerprint data; and
the second location estimate is determined based on the RF fingerprint data in the location assistance information.

3. The method of claim 1, wherein the first location request is submitted as a call to a function defined in an application programming interface (API) used by an application program, and the accuracy level is designated as a parameter by the API.

4. The method of claim 1, wherein determining that the uncertainty value does not satisfy the requested accuracy level comprises determining that the requested accuracy level, as measured in terms of distance, is smaller than the uncertainty value, as measured in terms of distance.

5. The method of claim 1, wherein determining that the location determination subsystem of the mobile device is incapable of determining the location of the mobile device-at the requested accuracy level comprises at least one of:
determining that the mobile device has not received radio frequency (RF) fingerprint data; or determining that no wireless signal sources corresponding to received RF fingerprint data has been detected.

6. The method of claim 1, wherein the mobile device submits the second location request through a wireless communication channel, the wireless communication channel being established using a protocol in which a communication range is less than the accuracy level.

7. The method of claim 1, wherein the location assistance information includes a location of the companion device.

8. The method of claim 1, wherein the location assistance information includes data that improves accuracy of a location estimate of the mobile device.

9. The method of claim 1, wherein the current conditions include at least one of lack of accuracy capability or lack of location data.

10. The method of claim 1, wherein determining that the location determination subsystem of the mobile device is incapable of determining the location of the mobile device at the requested accuracy level under current conditions includes at least one of 1) determining whether access points are detected, 2) determining whether signals associated with the access points are sufficiently strong for location determination, and 3) examining the detected signals and determining whether the signals are consistent with one another.

11. A system comprising:
one or more processors; and
at least one non-transitory computer-readable medium storing instructions that, when executed by the one or more processors, cause the one or more processors to perform operations comprising:
receiving, by a mobile device, a first location request requesting a location of the mobile device, the first location request specifying a requested accuracy level;
determining, by a location determination subsystem of the mobile device, a first location estimate of the mobile device, the first location estimate being associated with an uncertainty value that is determined by the location determination subsystem;
in response to determining that the uncertainty value does not satisfy the requested accuracy level, determining, by the mobile device, that the location determination subsystem of the mobile device is incapable of determining the location of the mobile device-at the requested accuracy level under current conditions;
in response to determining that the location determination subsystem of the mobile device is incapable of determining the location of the mobile device-at the requested accuracy level, submitting a second location request by the mobile device to a companion device that has paired with the mobile device, wherein the location determination subsystem is configured to determine the location of the mobile device based on location assistance information received from the companion device;
comparing the specified requested accuracy level to data representing a communication range of a communication protocol between the mobile device and the companion device;
determining that the communication range between the mobile device and the companion device meets the specified requested accuracy level; and
in response to receiving a response to the second location request from companion device, the response including the location assistance information, submitting a second location estimate corresponding to the location assistance information of the companion device as a response to the first location request.

12. The system of claim 11, wherein the location determination subsystem is configured to determine the location of the mobile device is configured to determine the location of the mobile device based on radio frequency (RF) fingerprint data;
the location assistance information received from the companion device includes the RF fingerprint data; and
the second location estimate is determined based on the RF fingerprint data in the location assistance information.

13. The system of claim 11, wherein the first location request is submitted as a call to a function defined in an application programming interface (API) used by an application program, and the accuracy level is designated as a parameter by the API.

14. The system of claim 11, wherein determining that the uncertainty value does not satisfy the requested accuracy level comprises determining that the requested accuracy level, as measured in terms of distance, is smaller than the uncertainty value, as measured in terms of distance.

15. The system of claim 11, wherein determining that the location determination subsystem of the mobile device is incapable of determining the location of the mobile device-at the requested accuracy level comprises at least one of:
determining that the mobile device has not received radio frequency (RF) fingerprint data; or
determining that no wireless signal sources corresponding to received RF fingerprint data has been detected.

16. The system of claim 11, wherein the mobile device submits the second location request through a wireless communication channel, the wireless communication channel is established using a protocol in which a communication range is less than the accuracy level.

17. The system of claim 11, wherein the location assistance information includes at least one of a location of the companion device or data that improves accuracy of a location estimate of the mobile device.

18. At least one non-transitory computer-readable medium storing instructions that, when executed by one or more processors, cause the one or more processors of a mobile device to perform operations comprising:

receiving, by the mobile device, a first location request requesting a location of the mobile device, the first location request specifying a requested accuracy level;

determining, by a location determination subsystem of the mobile device, a first location estimate of the mobile device, the first location estimate being associated with an uncertainty value that is determined by the location determination subsystem;

in response to determining that the uncertainty value does not satisfy the requested accuracy level, determining, by the mobile device, that the location determination subsystem of the mobile device is incapable of determining the location of the mobile device at the requested accuracy level under current conditions;

in response to determining that the location determination subsystem of the mobile device is incapable of determining the location of the mobile device-at the requested accuracy level, submitting a second location request by the mobile device to a companion device that has paired with the mobile device, wherein the location determination subsystem is configured to determine the location of the mobile device based on location assistance information received from the companion device;

comparing the specified requested accuracy level to data representing a communication range of a communication protocol between the mobile device and the companion device;

determining that the communication range between the mobile device and the companion device meets the specified requested accuracy level; and in response to receiving a response to the second location request from companion device, the response including the location assistance information, submitting a second location estimate corresponding to the location assistance information of the companion device as a response to the first location request.

19. The non-transitory computer-readable medium of claim 18, wherein the first location request is submitted as a call to a function defined in an application programming interface (API) used by an application program, and the requested accuracy level is designated as a parameter by the API.

20. The non-transitory computer-readable medium of claim 18, wherein determining that uncertainty value does not satisfy the requested accuracy level comprises determining that the requested accuracy level, as measured in terms of distance, is smaller than the uncertainty value, as measured in terms of distance.

* * * * *

UNITED STATES PATENT AND TRADEMARK OFFICE
CERTIFICATE OF CORRECTION

PATENT NO. : 9,838,838 B2
APPLICATION NO. : 14/869900
DATED : December 5, 2017
INVENTOR(S) : Stephen J. Rhee et al.

It is certified that error appears in the above-identified patent and that said Letters Patent is hereby corrected as shown below:

In the Claims

In Column 12, Line 53, Claim 1, delete "device-at" and insert -- device at --, therefor.

In Column 13, Lines 29-30, Claim 5, delete "device-at" and insert -- device at --, therefor.

In Column 14, Line 8, Claim 11, delete "device-at" and insert -- device at --, therefor.

In Column 14, Line 12, Claim 11, delete "device-at" and insert -- device at --, therefor.

In Column 14, Lines 55 and 56, Claim 15, delete "device-at" and insert -- device at --, therefor.

In Column 15, Line 24, Claim 18, delete "device-at" and insert -- device at --, therefor.

Signed and Sealed this
Seventh Day of May, 2019

Andrei Iancu
*Director of the United States Patent and Trademark Office*